(12) United States Patent
Gaudern (10) Patent No.: US 12,404,833 B2
(45) Date of Patent: Sep. 2, 2025

(54) VORTEX GENERATOR

(71) Applicant: POWER CURVE ApS, Aalborg (DK)

(72) Inventor: Nicholas Gaudern, Aalborg (DK)

(73) Assignee: POWER CURVE ApS, Aalborg (DK)

( * ) Notice: Subject to any disclaimer, the term of this patent is extended or adjusted under 35 U.S.C. 154(b) by 0 days.

(21) Appl. No.: 18/729,086

(22) PCT Filed: Jan. 19, 2023

(86) PCT No.: PCT/EP2023/051290
§ 371 (c)(1),
(2) Date: Jul. 15, 2024

(87) PCT Pub. No.: WO2023/139177
PCT Pub. Date: Jul. 27, 2023

(65) Prior Publication Data
US 2025/0084823 A1  Mar. 13, 2025

(30) Foreign Application Priority Data
Jan. 19, 2022 (DK) .............................. PA202270023

(51) Int. Cl.
*F03D 1/06* (2006.01)
(52) U.S. Cl.
CPC .. *F03D 1/06495* (2023.08); *F05B 2240/3062* (2020.08)
(58) Field of Classification Search
CPC ................. F03D 1/06495; F05B 2240/3062
See application file for complete search history.

(56) References Cited

U.S. PATENT DOCUMENTS

| 2,740,596 | A | | 4/1956 | Lee | |
|---|---|---|---|---|---|
| 4,128,363 | A | * | 12/1978 | Fujikake | F04D 19/002 416/175 |
| 9,494,132 | B2 | * | 11/2016 | Riddell | F03D 13/10 |
| 10,041,470 | B2 | * | 8/2018 | Ramachandran | F03D 1/0633 |

(Continued)

FOREIGN PATENT DOCUMENTS

| EP | 2129908 A2 | 12/2009 |
|---|---|---|
| EP | 2713044 A1 | 4/2014 |

(Continued)

OTHER PUBLICATIONS

Search Report and Written Opinion issued in International Application No. PCT/EP2023/051290, issued Mar. 27, 2023.

(Continued)

*Primary Examiner* — Eldon T Brockman
(74) *Attorney, Agent, or Firm* — Bookoff Mcandrews, PLLC (57) ABSTRACT

Vortex generator comprising a first fin and a second fin, said first fin being arranged upstream of said second fin. The first fin and the second fin are arranged such that the shortest distance between the trailing edge of the first fin and the leading edge of the second fin is less than 50% of the length of the first fin and such that the first fin and the second fin are arranged such that the first fin affects the flow of air passing the first fin such that it is directed towards the second fin. In this way a vortex generator is provided which shows lower drag while maintaining the same lift improvement as prior art type vortex generators.

13 Claims, 4 Drawing Sheets

(56) References Cited

U.S. PATENT DOCUMENTS

| | | | |
|---|---|---|---|
| 10,161,252 B2* | 12/2018 | Diez-Garias | F01D 5/141 |
| 11,525,430 B2* | 12/2022 | Doosttalab | F03D 1/0633 |
| 2009/0068018 A1* | 3/2009 | Corten | F03D 1/0641 |
| | | | 416/223 R |
| 2011/0142673 A1* | 6/2011 | Fang | F03D 1/0675 |
| | | | 416/241 R |
| 2012/0248072 A1 | 10/2012 | McClure et al. | |
| 2013/0001362 A1 | 1/2013 | Kreuzer et al. | |
| 2013/0037657 A1 | 2/2013 | Breidenthal | |
| 2015/0204306 A1 | 7/2015 | Herr et al. | |
| 2015/0292476 A1* | 10/2015 | Obrecht | F03D 1/0633 |
| | | | 416/228 |
| 2016/0177914 A1 | 6/2016 | Enevoldsen et al. | |
| 2018/0283403 A1* | 10/2018 | Schilling | F04D 29/38 |
| 2021/0078651 A1 | 3/2021 | Biancalana et al. | |

FOREIGN PATENT DOCUMENTS

| | | |
|---|---|---|
| EP | 2824320 A1 | 1/2015 |
| EP | 2933475 A1 | 10/2015 |
| EP | 3037656 A1 | 6/2016 |
| EP | 3042073 A1 | 7/2016 |
| WO | 0116482 A1 | 3/2001 |
| WO | 2007114698 A2 | 10/2007 |
| WO | 2019212456 A1 | 11/2019 |

OTHER PUBLICATIONS

Search Report for Danish Patent Application No. PA202270023, dated Jul. 8, 2022, pp. 1-4.

* cited by examiner

VORTEX GENERATOR

CROSS-REFERENCE TO RELATED APPLICATIONS

This is a National Stage Application under 35 U.S.C. § 371 of International Application No. PCT/EP2023/051290, filed Jan. 19, 2023, which claims priority to Denmark Patent Application No. PA202270023, filed on Jan. 19, 2022.

The current invention relates to a vortex generator comprising a first fin and a second fin, said first fin being arranged upstream of said second fin. The invention also relates to a lifting body with a vortex generator. The invention further relates to a vortex generator add-on.

DESCRIPTION OF RELATED ART

Vortex generators are well known in the art and are used to increase the effectiveness of a lifting body. Vortex generators are often used on wind turbine blades and airplane wings. They are usually arranged as a small fin attached to a surface of a wing and arranged at an angle to the airflow over the surface. They are usually attached to the suction surface, but can also be applied to the pressure surface. Since the small fin is arranged at an angle to the flow over the wing, the fin thereby generates a vortex over the surface of a wing. This delays flow separation of the boundary layer as the vortex entrains higher energy fluid away from the surface and draws it down to energize the boundary layer. Typically a plurality of fins are used arranged adjacently along the longitudinal axis of the wing.

As vortex generators and the theory behind them is well known in the art and is described in many textbooks as well as in many references and articles online, this specification will not discuss the theory in any detail. The reader is referred to the available literature for more details.

Some example patent documents which describe known vortex generators are EP2713044, EP2129908 and EP2933475. Most Vortex Generators are in the form of a simple triangular plate element extending perpendicularly to the surface of the lifting body. However, other more complicated Vortex Generators are also known in the art. See for example EP2824320 and EP3042073. Vortex Generators are also known with multiple fins of different sizes arranged in series along the chord line of the aerofoil of the lifting body. See for example EP3037656. In the case of EP3037656, the objective is for the one fin to cancel the effect of the other fin in certain situations. In effect, the two fins are generating two separate vortices which counteract each other in certain situations.

The typical goal of a Vortex Generator installation is to increase the maximum lift coefficient that the lifting body can produce, hence increasing the stall margin. An increased stall margin can be useful for control and load mitigation purposes, and will typically result in the lifting body being more robust to surface contamination such as leading edge erosion.

However, the known vortex generators, while increasing the maximum lift of the lifting bodies, also increase the drag at all pre-stall angles of attack. Hence, while the overall effectiveness of the lifting body is increased with the prior art vortex generators, it is desired to increase the maximum lift without increasing the parasitic drag component by as much.

SUMMARY OF THE INVENTION

A first aspect of the current invention is therefore to provide a vortex generator which when attached to a lifting body increases the effectiveness of the lifting body more than the prior art type vortex generators.

A second aspect of the current invention is to provide a vortex generator which is easy to apply.

A third aspect of the current invention is to provide a vortex generator which has lower drag than prior art type vortex generators while providing the same or more lift improvements than the prior art type vortex generators.

A fourth aspect of the current invention is to provide a vortex generator which is low cost.

A fifth aspect of the current invention is to provide a vortex generator which is robust.

These aspects are provided at least in part by a vortex generator as defined in the opening paragraph but characterized in that the shortest distance between the trailing edge of the first fin and the leading edge of the second fin is less than 50% of the length of the first fin, in that said first fin and said second fin are arranged such that the first fin affects the flow of air passing the first fin such that it is directed towards the second fin, in that the first fin has a non-zero camber, in that the cross section of the pressure surface of the first fin comprises a concave portion and in that said concave portion is arranged such that the airflow passing over the first fin is directed towards the suction surface of the second fin. It should be noted that in certain cases, the trailing edge of the first fin will be arranged upstream of the leading edge of the second fin. In this case, there will be a gap between the first and second fin. In other cases, it could be that the trailing edge of the first fin is arranged downstream of the leading edge of the second fin. In this cases, there will be an overlap between the first and second fin. The distance claimed above, can be measured in both cases. Hence, the specification of a distance should not limit the claim to a situation where there is a gap between the fins, but should also cover the situation where there is an overlap between the fins.

In this way, the two fins form a cooperating system, where the flow from the first fin engages directly with the second fin to create a single vortex. This is in contrast to the situation where two fins are arranged behind each other, but far away from each other so that two competing vortices are formed.

In some embodiments, the maximum distance between the trailing edge of the first fin and the leading edge of the second fin is less than 40%, less than 30% or less than 20% of the length of the first fin. In some embodiments, the vortex generator comprises a third fin arranged downstream of the second fin, said second fin and said third fin being arranged such that the second fin affects the flow of air passing the second fin such that it is directed towards the third fin. Similar distances as for the first and second fins, can also be applied to the second and third fins.

In some embodiments, the first and/or the second fin has/have a cross section in the form of an aerofoil. In some embodiments, the aerofoil could be a symmetric aerofoil. By using a fin in the shape of an aerofoil, the drag of the vortex generator can be reduced while the lift can be increased. In some embodiments, the first and/or second fin could be a plate. In some embodiments, the plate could be flat. In some embodiments, the plate could be curved.

In some embodiments, the second fin has a non-zero camber. In some alternative embodiments, the second fin has a camber of zero.

In some embodiments, the cross section of the pressure surface of the second fin comprises a concave portion. In some embodiments, the concave portion of the first and/or second fin extends along more than 20%, more than 40% or more than 60% of the length of the fin. In some embodiments, the concave portion of the first and/or second fin is arranged towards the trailing edge of the fin. In some embodiments, the concave portion of the first and/or second fin is arranged at the trailing edge of the fin.

In some embodiments, the first fin is arranged such that the airflow as it leaves the trailing edge of the first fin is arranged essentially tangential to the surface of the second fin at the point the airflow contacts the second fin. In some embodiments, both the first and the second fin comprise a cross section in the form of an aerofoil with a non-zero camber.

In some embodiments, the first and/or second fin have a tapered form when seen from the side such that the upstream end of the fin has a lower height than the downstream end of the fin. In some embodiments, the maximum height of the first fin is less than the maximum height of the second fin. In some embodiments, the height is defined as the distance between the lower edge and the upper edge of the fin. In some embodiments, where the fins are mounted on an attachment plate, the height is defined as the distance from the upper surface of the attachment plate to the upper edge of the fin.

In some embodiments, the first fin overlaps the second fin in a viewing direction which is perpendicular to a plane which is parallel to a line connecting the leading edge of the first fin and the trailing edge of the second fin. In some embodiments the first and second fin comprise a lower edge which is arranged to be connected to a surface of a lifting body and an upper edge which is free. In some embodiments, the viewing direction is furthermore arranged perpendicular to a plane which passes through the upper edge of the first and/or second fin. In some embodiments, the viewing direction is arranged horizontally. In some embodiments, where the vortex generator is attached to a lifting body, the viewing direction is arranged along the longitudinal axis of the lifting body.

In some embodiments, the first fin overlaps the second fin less than 30%, less than 25%, less than 20% or less than 15% of the side area of the second fin. In some embodiments, the first fin overlaps the second fin at least 1%, at least 2% or at least 3% of the side area of the second fin.

In some embodiments, the vortex generator comprises a third fin arranged downstream of the second fin, said third fin overlapping the second fin in a viewing direction which is perpendicular to a plane which is parallel to a line connecting the leading edge of the second fin and the trailing edge of the third fin. In some embodiments, the same amount of overlaps as mentioned with regards to the first and second fins, can be applied to the second and third fins.

The invention also relates to a lifting body having a longitudinal axis, a suction surface, a pressure surface and a plurality of vortex generators according to any one of the embodiments described above arranged along the longitudinal axis of the lifting body on the suction and/or pressure surface.

In some embodiments, the plurality of vortex generators are arranged such that adjacent vortex generators form different angles to the longitudinal axis of the lifting body such that counter-rotating vortices are generated by adjacent vortex generators. In some embodiments, the plurality of vortex generators are arranged such that adjacent vortex generators form similar angles to the longitudinal axis of the lifting body such that co-rotating vortices are generated by adjacent vortex generators.

In some embodiments, the lifting body is a wind turbine blade and the plurality of vortex generators comprises a first plurality of vortex generators arranged along an inner portion of the wind turbine blade and a second plurality of vortex generators arranged along an outer portion of the wind turbine blade, the vortex generators in said first plurality of vortex generators having at least one more fin than the vortex generators of the second plurality of vortex generators. In this way, a wind turbine blade can be provided with different vortex generators at different portions of the blade where the vortex generators are chosen to optimize the lift and drag provided by the vortex generators at the different portions of the blade. In the scope of the current invention, in general, the higher number of fin versions have a higher lift, but also a higher drag than lower number of fin versions (keeping all other parameters the same). Hence, in certain cases, a high lift/higher drag version might be suitable for an inner portion of the blade while a lower lift/lower drag version might be more suitable for an outer portion of the blade since the air speed is higher towards the outer portion of the blade. It should be noted that outer/inner portion refers to the distance from the hub of the wind turbine, where the outer portion is further from the hub than the inner portion.

In some embodiments, the vortex generators of the first plurality of vortex generators have three fins and the vortex generators of the second plurality of vortex generators have two fins. The three and two fin versions are a good choice, however, other numbers of fins could also be imagined.

The invention also relates to a vortex generator add-on, said vortex generator add-on comprising an attachment plate and a vortex generator according to any one of the embodiments described above. In some embodiments, the lower edge of the first and second fins are fastened to the attachment plate and said fins extend away from said attachment plate. In some embodiments, the first and second fins are arranged to extend perpendicularly from the attachment plate.

In some embodiments, the vortex generator add-on further comprises a plurality of vortex generators according to any one of the embodiments described above, arranged along a longitudinal axis of the attachment plate. In some embodiments, the plurality of vortex generators are arranged such that adjacent vortex generators are arranged to form counter-rotating vortices when an air-flow passes over the vortex generators. In some embodiments, the vortex generator add-on is a plastic injection moulded element.

It should be emphasized that the term "comprises/comprising/comprised of" when used in this specification is taken to specify the presence of stated features, integers, steps or components but does not preclude the presence or addition of one or more other features, integers, steps, components or groups thereof. For example, in the claims it is stated that the vortex generator comprises a first fin and a second fin, however, this should be understood as in that the vortex generator comprises at least a first fin and at least a second fin. Vortex generators according to the invention could have 2, 3, 4+ fins, all encompassed within the scope of the claims.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

Figures 1, 2:
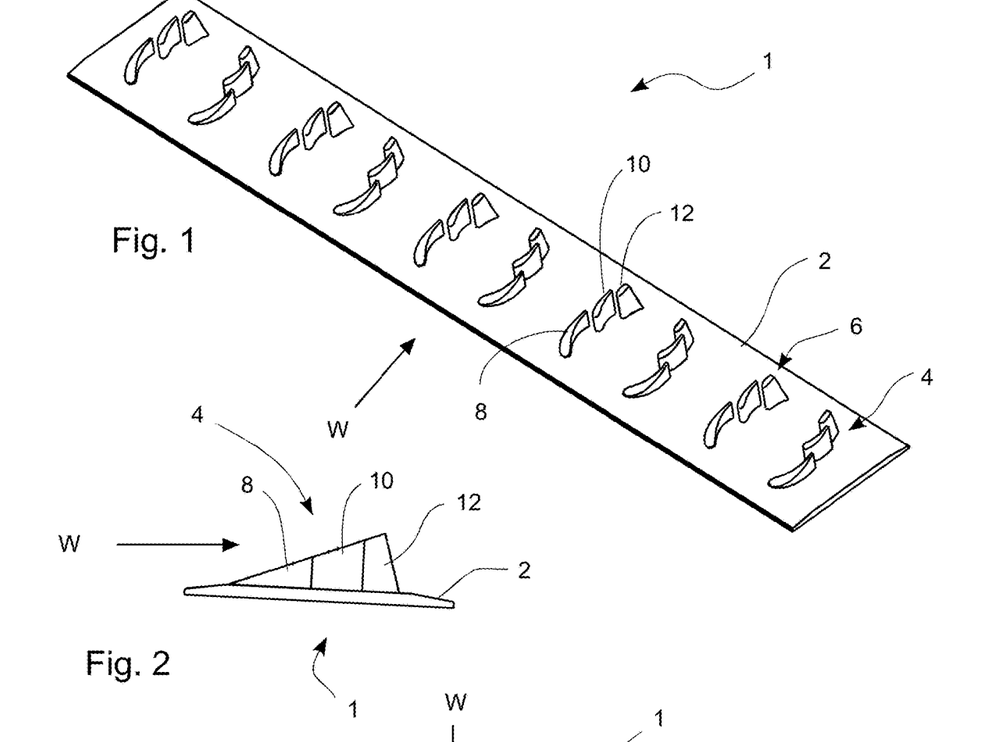
FIG. 1 shows a perspective view of a first embodiment of a vortex generator add-on having a plurality of vortex generators according to a first embodiment of the invention.
FIG. 2 shows a side view of the vortex generator add-on of FIG. 1.
Figure 3:
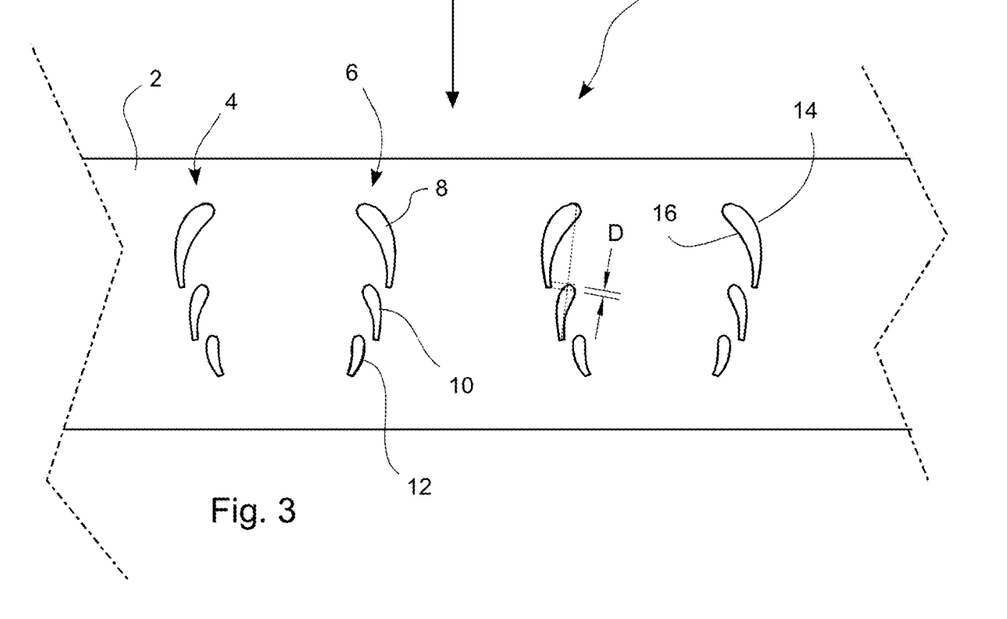
FIG. 3 shows a top view of the vortex generator add-on of FIG. 1.

FIGS. 1-3 show a first embodiment of a vortex generator add-on 1. By Vortex Generator add-on is meant a separate element which can be attached to an existing lifting body. In this embodiment, the add-on comprises an attachment plate 2 and an array of vortex generators 4,6 arranged along the longitudinal axis of the attachment plate. In this embodiment, there are 5 pairs of vortex generators. Each pair of vortex generators comprises a first vortex generator 4 and a second vortex generator 6. The two vortex generators of a pair of vortex generators are arranged mirrored with respect to each other. In this way, they form equal but opposite angles to the longitudinal axis of the attachment plate. In this way, each pair of vortex generators will generate two separate counter rotating vortices. This is standard practice in the art of Vortex Generators. It should be noted that other forms of arrangements could also be used, for example, an attachment plate (not shown) with a linear array of identical vortex generators having the same angle to the longitudinal axis and generating multiple co-rotating vortices. Likewise, the current embodiment shows an attachment plate having 5 sets of vortex generator pairs. However, another embodiment (not shown) could be in the form of an attachment plate with a single vortex generator attached to it. In this case, multiple add-ons would be added to the lifting body as desired. Another embodiment would be an attachment plate with two vortex generators on it. The general arrangement of the vortex generators is not a feature of the current invention, as these types of arrangements are known in the prior art. The contribution of the current invention relates to the shape of the individual vortex generator.

In this embodiment, the vortex generator 4 comprises a first fin 8, a second fin 10 and a third fin 12. The fins are arranged such that the first fin is arranged upstream of the second fin which is arranged upstream of the third fin. The fins are arranged such that the distance between the trailing edge of the forward fin and the leading edge of the rearward fin is quite small. In the embodiment shown, there is a slight overlap of the forward fin with the rearward fin. The overlap between the first fin and the second fin is shown in FIG. 3 with the distance D. In this embodiment, the overlap is defined as being in a plane which is parallel to a vector which connects the leading edge of the first fin and the trailing edge of the second fin. Other definitions could also be used. For example, the overlap when viewing the vortex generator along a viewing distance which is parallel to the longitudinal axis of the attachment plate could be specified.

The fins are all arranged with an aerofoil shape and with a positive camber. The suction surface 14 is arranged as a convex surface and the pressure surface 16 is arranged as a concave surface. Due to the arrangement of the fins, the forward fin will meet the airflow first (the direction of the air flow is illustrated as a vector W in the figures) and then redirect the airflow flowing over the first fin towards the rearward fin's suction surface. In this way, the fins have a similar effect as leading edge slats on an airplane wing. In this way, the flow from the first fin works together with the flow over the second fin. They therefore form a single cooperating system, in contrast to prior art staggered fins where the staggered fins of the prior art formed two separate systems which counteracted each other.

As can especially be seen from FIG. 2, all three fins are tapered when seen from the side with the leading edge being lower than the trailing edge. Likewise, the first fin is the lowest, the second fin is the second lowest and the third fin is the tallest. This is similar to the shape of prior art vortex generators.

Furthermore, from the figures, especially FIG. 3, it can be seen that in this embodiment, in addition to redirecting the flow from the first fin towards the second fin, the first fin is also arranged such that when the flow leaves the trailing edge of the first fin, it is travelling approximately tangentially to the suction surface of the second fin at the approximate location where it will impact the second fin.

Figure 4:
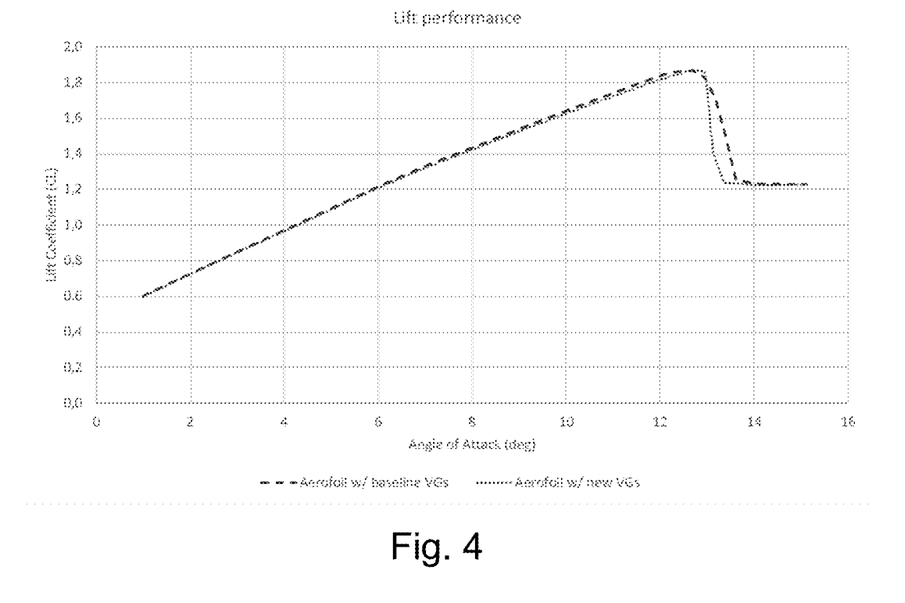
FIG. 4 shows a graph of results from wind tunnel testing comparing the lift of a blade with standard VGs (dashed line) and a blade with the VGs of the current invention (dotted line).
Figure 5:
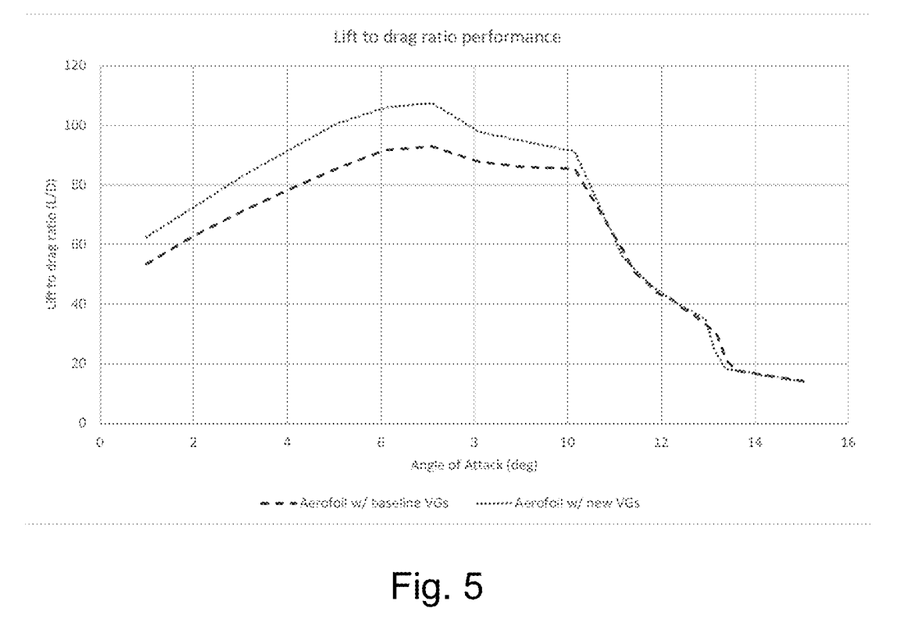
FIG. 5 shows a graph of results from wind tunnel testing comparing the L/D ratio of a blade with standard VG's (dashed line) and a blade with the VG's of the current invention (dotted line).

FIGS. 4 and 5 show some results from wind tunnel testing. In these tests a section of a standard wind turbine blade was mounted in a wind tunnel and vortex generators according to a first prior art type were added to the suction surface of the blade. The test then measured the Lift coefficient (FIG. 4) and the Drag Coefficient at different angles of attack. The Lift over Drag coefficient (FIG. 5) was then calculated from the tests. The results from the prior art VGs were plotted with dashed lines. The prior art VGs were then removed and VGs according to the current invention were attached. In order to compare directly, the VGs of the current invention where chosen to be essentially the same size, have essentially the same taper and be mounted in essentially the same locations as the prior art VGs. The results of the test were then plotted with the dotted lines in the figures. As can be seen, the lift of the new VG's is very similar to the prior art VG's however, the drag is much reduced as shown by the increased L/D coefficient shown in FIG. 5. Hence the parasitic drag of the new VG's is much reduced in comparison to the parasitic drag of the prior art VG's. Hence, the new VG's will perform much better than the prior art VG's.

Figures 6, 7:
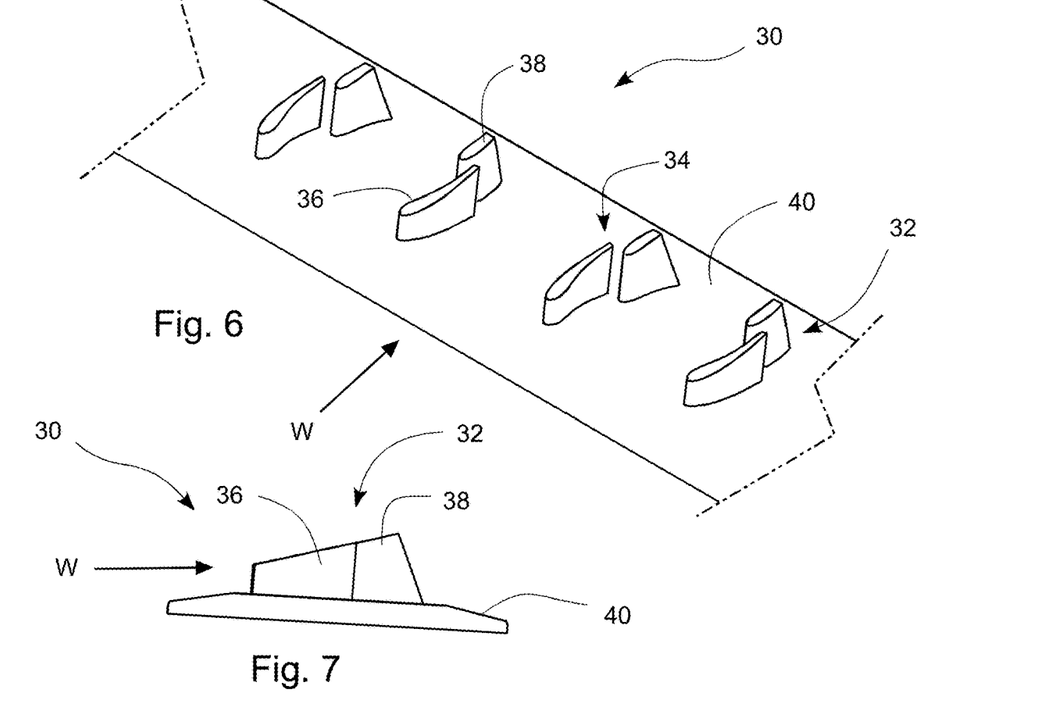
FIG. 6 shows a perspective partial view of a second embodiment of a vortex generator add-on having a plurality of vortex generators according to a second embodiment of the invention.
FIG. 7 shows a side view of the vortex generator add-on of FIG. 6.
Figure 8:
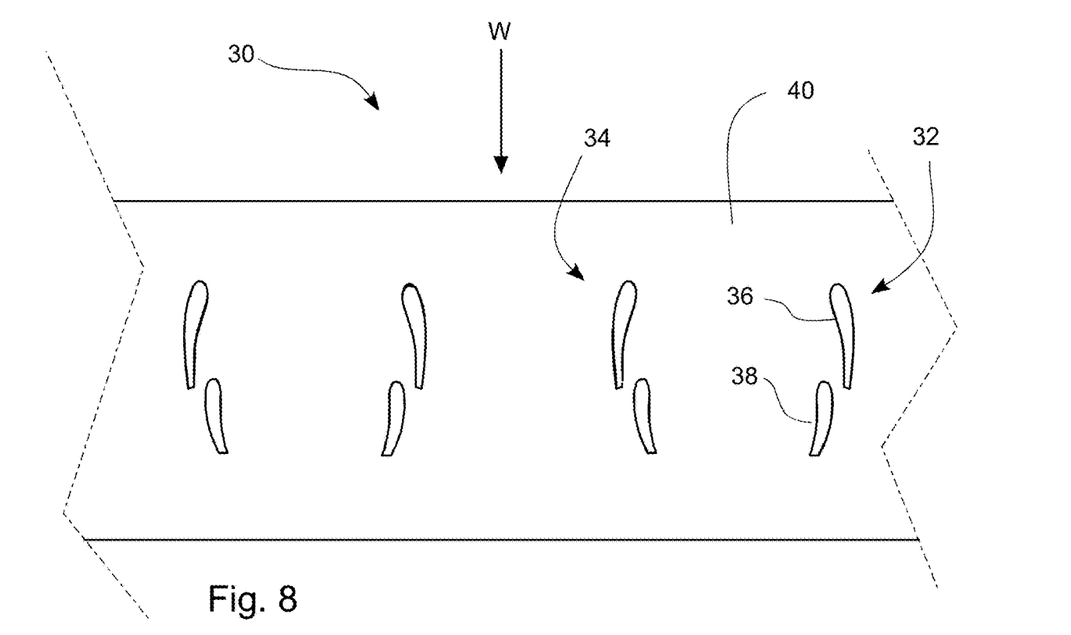
FIG. 8 shows a top view of the vortex generator add-on of FIG. 6.

FIGS. 6-8 show a partial view of a second embodiment of a vortex generator add-on 30. The second embodiment, comprises a plurality of vortex generator pairs 32, 34 as with the previous embodiment, and where each pair of vortex generators comprises two separate identical, but mirrored vortex generators 32, 34. In contrast to the previous embodiment, in this embodiment, the vortex generators each comprise only two fins 36,38 in contrast to the first embodiment which comprised three fins. The two fins of the current embodiment comprises a first fin 36 and a second fin 38. As before, the first fin overlaps the second fin a small amount. As before, the vortex generators are mounted on an attachment plate 40.

The add-ons as described in this application are manufactured as an injection moulded plastic component comprising both the attachment plate and the vortex generators as a single integral component. In this way, the shape of the vortex generators can be rather complicated without leading to extra costs of the actual component. The cost of the mould is increased, however, the per item cost is not significantly impacted. Likewise, by forming the add-ons with multiple vortex generator pairs, the cost of mounting them on the blade is reduced since fewer pieces need to be attached to the blade. While injection moulding is described as one option for manufacturing the add-ons, other options are also possible.

Furthermore, in the embodiments described in this specification, the vortex generators have been mounted on an attachment plate which is then attached to the surface of the blade. However, within the scope of the current invention, the vortex generators could also be manufactured as separate elements and attached directly to a blade.

Figure 9:
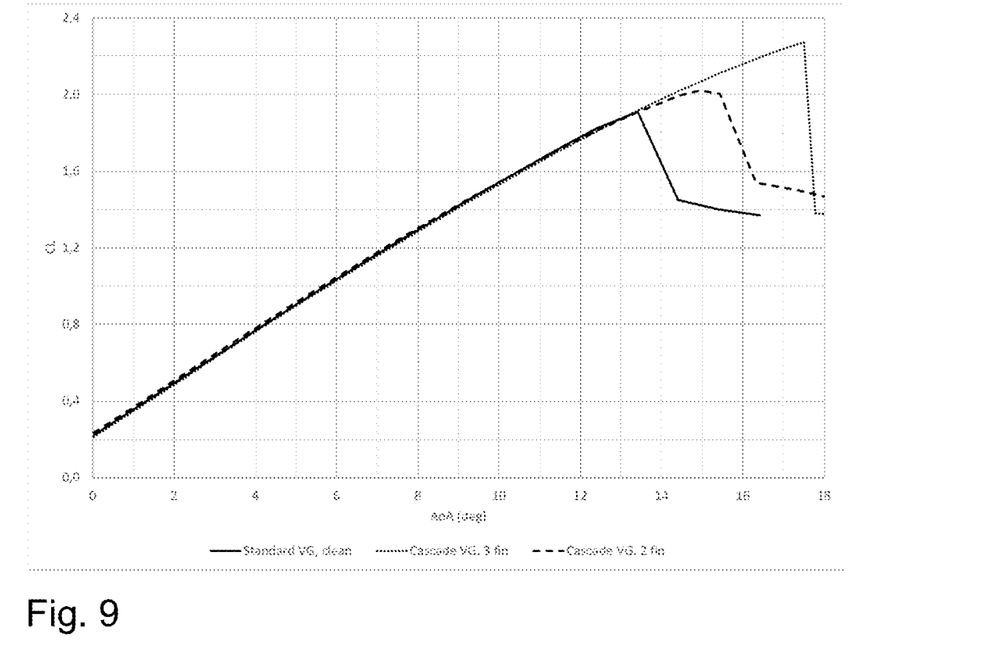
FIG. 9 shows a graph of results from wind tunnel testing comparing the lift of a blade with standard VGs (solid line), a blade with the VGs of the current invention with two fins (dashed line) and a blade with the VGs of the current invention with three fins (dotted line).
Figure 10:
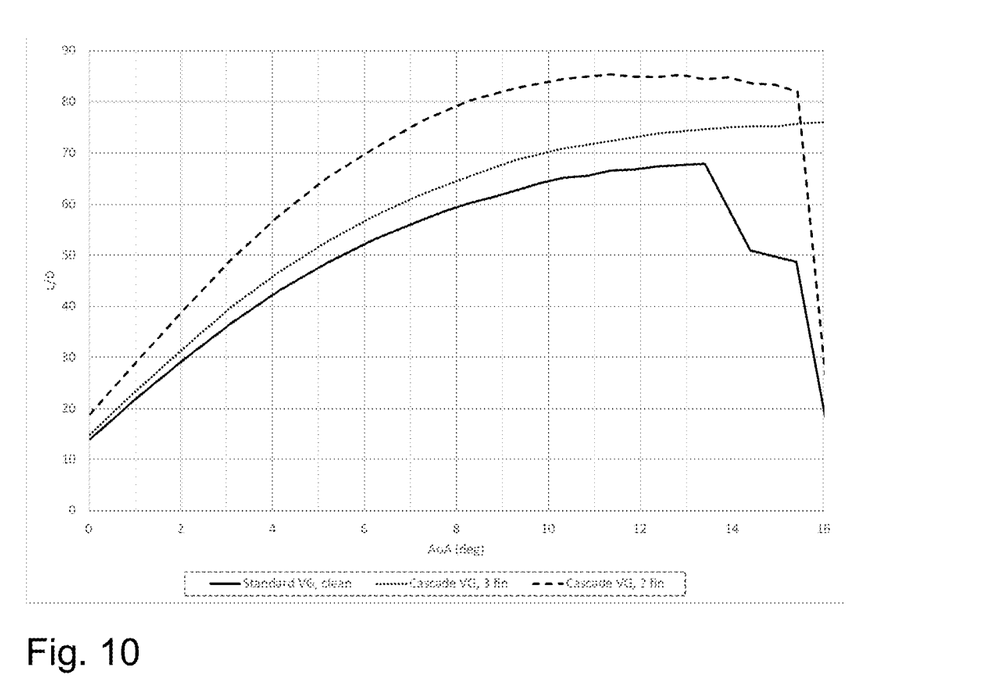
FIG. 10 shows a graph of results from wind tunnel testing comparing the L/D ratio of a blade with standard VG's (solid line), a blade with the VGs of the current invention with two fins (dashed line) and a blade with the VGs of the current invention with three fins (dotted line).

FIGS. 9 and 10 illustrate the possibilities of further tuning of the vortex generator arrangement on an actual blade. It has been found that in general, the higher the number of fins, the higher the positive lift contribution of the vortex generator. This is of course, assuming all other parameters are kept the same. This is illustrated in FIG. 9 where the lift coefficient is shown for different angles of attack for different vortex generators. The solid line shows the lift provided by a standard vortex generator, the dashed line shows the lift provided by a two fin version of the vortex generator of the current invention while the dotted line shows the lift provided by a three fin version of the vortex generator of the current invention. It can be seen that the lift provided by the three fin version is better than the lift provided by the two fin version.

However, it has also been found that additional fins increases the drag of the vortex generator. Hence, for increased number of fins, the lift increases, but the drag also increases. In fact, the L/D ratio falls for higher number of fins. This is illustrated in FIG. 10 where the L/D ratio at different angles of attack for a standard VG are shown in the solid line, the L/D ratio for a two fin version is shown in the dashed line and the L/D ratio of a three fin version is shown in the dotted line. As can be seen, the L/D ratio of both the two fin and the three fin versions are better than the standard VG, however, the L/D ratio of the two fin version is higher than the L/D ratio of the three fin version.

Due to this variation, the arrangement of the VGs can be optimized for a blade. For example, a two fin version could be arranged on the outer portion of the blade where the drag has a larger negative effect due to the higher speeds of the blade, while a three fin version could be placed on an inner portion of the blade, where the airspeeds are lower, but where the increased lift has a greater positive effect. Hence, in certain embodiments, one could imagine that a wind turbine blade is provided where a two fin version is placed on the outer portion of the blade and a three fin version is placed on the inner portion of the blade. As will be known to the person skilled in the art, the size of the vortex generators is also typically adjusted based on local chord length. So the height of the vortex generators on the outer portion of the blade would in many cases be less than the height of the vortex generators on the inner portion of the blade.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific injection moulding procedure have not been described in detail since it is maintained that the person skilled in the art would be able to find suitable materials and suitable processes to manufacture the vortex generator according to the current invention.

The invention claimed is:

1. A vortex generator comprising a first fin and a second fin, said first fin being arranged upstream of said second fin, wherein a shortest distance between a trailing edge of the first fin and a leading edge of the second fin is less than 50% of a length of the first fin, in that said first fin and said second fin are arranged such that the first fin affects a flow of air passing the first fin such that it is directed towards the second fin, in that the first fin has a non-zero camber, in that a cross section of a pressure surface of the first fin comprises a concave portion and in that said concave portion is arranged such that airflow passing over the first fin is directed towards a suction surface of the second fin.

2. The vortex generator according to claim 1, wherein the first and/or the second fin has/have a cross section in a form of an aerofoil.

3. The vortex generator according to claim 1, wherein the second fin has a non-zero camber.

4. The vortex generator according to claim 1, wherein the cross section of the pressure surface of the second fin comprises a concave portion.

5. The vortex generator according to claim 1, wherein the first and/or second fin have a tapered form such that an upstream end of the fin has a lower height than a downstream end of the fin.

6. The vortex generator according to claim 1, wherein the first fin overlaps the second fin in a viewing direction which is perpendicular to a plane which is parallel to a line connecting the leading edge of the first fin and the trailing edge of the second fin.

7. The vortex generator according to claim 1, wherein said vortex generator comprises a third fin arranged downstream of the second fin, said second fin and said third fin being arranged such that the second fin affects the flow of air passing the second fin such that it is directed towards the third fin.

8. A lifting body having a longitudinal axis, a suction surface, a pressure surface and a plurality of vortex generators according to claim 1 arranged along the longitudinal axis of the lifting body on the suction and/or pressure surface.

9. The lifting body according to claim 8, wherein the plurality of vortex generators are arranged such that adjacent vortex generators form different angles to the longitudinal axis of the lifting body such that counter-rotating vortices are generated by adjacent vortex generators.

10. The lifting body according to claim 8, wherein said lifting body is a wind turbine blade and in that the plurality of vortex generators comprises a first plurality of vortex generators arranged along an inner portion of the wind turbine blade and a second plurality of vortex generators arranged along an outer portion of the wind turbine blade, the vortex generators in said first plurality of vortex generators having at least one more fin than the vortex generators of the second plurality of vortex generators.

11. The lifting body according to claim 10, wherein the vortex generators of the first plurality of vortex generators have three fins and in that the vortex generators of the second plurality of vortex generators have two fins.

12. A vortex generator add-on, said vortex generator add-on comprising an attachment plate and the vortex generator according to claim 1.

13. The vortex generator add-on according to claim 12, wherein said vortex generator add-on further comprises a plurality of vortex generators arranged along a longitudinal axis of the attachment plate.

* * * * *